United States Patent
Ren et al.

(10) Patent No.: US 12,470,348 B2
(45) Date of Patent: Nov. 11, 2025

(54) SYSTEMS AND METHODS FOR ENHANCING UPLINK TRANSMISSION

(71) Applicant: ZTE CORPORATION, Guangdong (CN)

(72) Inventors: Min Ren, Shenzhen (CN); Xianghui Han, Shenzhen (CN); Junfeng Zhang, Shenzhen (CN); Jing Shi, Shenzhen (CN); Peng Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 387 days.

(21) Appl. No.: 18/172,861

(22) Filed: Feb. 22, 2023

(65) Prior Publication Data

US 2023/0208593 A1    Jun. 29, 2023

Related U.S. Application Data

(63) Continuation of application No. PCT/CN2020/119638, filed on Nov. 30, 2020.

(51) Int. Cl.
*H04L 5/00* (2006.01)
*H04W 72/0446* (2023.01)

(52) U.S. Cl.
CPC ....... *H04L 5/0051* (2013.01); *H04W 72/0446* (2013.01)

(58) Field of Classification Search
CPC ..... H04L 5/0051; H04L 1/08; H04W 72/0446
See application file for complete search history.

(56) References Cited

U.S. PATENT DOCUMENTS

2015/0023275 A1   1/2015  Kim et al.
2015/0208366 A1   7/2015  Papasakellariou et al.
(Continued)

FOREIGN PATENT DOCUMENTS

CN         110474726 A      11/2019

OTHER PUBLICATIONS

NPL1 (Nokia et al: "On collisions between sTTI and TTI transmissions in UL", 3GPP Draft; R1-1712936 STTI and TTI Collisions in UL, 3rd Generation Partnership Project (3GPP), Mobile Competence Centre; Aug. 21, 2017-Aug. 25, 2017 Aug. 20, 2017 (Aug. 20, 2017), XP051315746; document included in file with IDS) (Year: 2017).*

(Continued)

*Primary Examiner* — Michael A Keller
(74) *Attorney, Agent, or Firm* — Foley & Lardner LLP

(57) ABSTRACT

Systems and methods for wireless communications are disclosed herein. Example implementations include a wireless communication method of dividing, by a wireless communication device, an uplink transmission into a plurality of virtual uplink transmissions based on one or more time-domain parameters, and determining, by the wireless communication device for each of the plurality of virtual uplink transmissions, respective time-domain positions of one or more demodulation reference signals. Example implementations also include a wireless communication method of determining, by a wireless communication device, a number of valid symbols for an uplink transmission, and determining, by the wireless communication device for the uplink transmission, respective time-domain positions of one or more demodulation reference signals.

15 Claims, 10 Drawing Sheets

(56) References Cited

U.S. PATENT DOCUMENTS

| | | | | |
|---|---|---|---|---|
| 2016/0359593 | A1* | 12/2016 | Dai | H04W 72/0453 |
| 2018/0206225 | A1* | 7/2018 | Li | H04L 1/1861 |
| 2018/0248671 | A1* | 8/2018 | Bhattad | H04L 5/0005 |
| 2019/0090126 | A1 | 3/2019 | Hayashi et al. | |
| 2019/0103941 | A1* | 4/2019 | Seo | H04L 1/0071 |
| 2019/0124675 | A1 | 4/2019 | Gao et al. | |

OTHER PUBLICATIONS

Partial Supplementary European Search Report for EP Appl. No. 20955775.0, dated Sep. 22, 2023 (15 pages).

3rd Generation Partnership Project; Technical Specification Group Radio Access Network; NR; Physical channels and modulation (Release 16), 3GPP TS 38.211 V16.2.0 (Jun. 2020), 128 pages.

First Office Action for CN Appl. No. 202080104458.5, dated Sep. 9, 2024 (with English translation, 28 pages).

Panasonic, "On PUSCH enhancements for NR URLLC", 3GPP TSG RAN WG1 #98, R1-1908939, Aug. 30, 2019, Prague, CZ (8 pages).

Samsung, "PUSCH coverage enhancement", 3GPP TSG RAN WG1 #102-e, R1-2006162, Aug. 28, 2020, e-Meeting (5 pages).

International Search Report and Written Opinion for PCT Appl. No. PCT/CN2020/119638, mailed Jun. 24, 2021 (9 pages).

Nokia et al.: "On collisions between sTTI and TTI transmissions in UL" 3GPP TSG RAN WG1 Meeting #90; R1-1712936; Aug. 25, 2017; Prague, Czech Republic (7 pages).

3rd Generation Partnership Project; Technical Specification Group Radio Access Network; NR; Physical channels and modulation (Release 16), 3GPP TS 38.211 V16.2.0, Jun. 2020 (7 pages).

Notice of Reasons for Rejection for JP Appl. No. 2023-513109, dated Mar. 22, 2024 (with English translation, 18 pages).

Wilus Inc., "Discussion on potential techniques for PUSCH coverage enhancement", 3GPP TSG RAN WG1 #102-e, R1-2006892, Aug. 28, 2020, e-Meeting (5 pages).

* cited by examiner

900

Divide UL Transmission into Virtual UL Transmission(s) 910

Divide Based on Time Domain Parameter(s) 912

Determine DMRS Position in Virtual UL Transmission(s) 920

Identify Valid Symbol(s) for UL Transmission  1010

Determine DMRS Position of Reference Signal(s)  1020

1100

Identify Invalid Symbol(s) for UL Transmission  1110

Divide UL Transmission into Multiple UL Transmissions  1120

Divide UL Transmission at Invalid Symbol(s)  1122

Determine DMRS Position of Reference Signal(s)  1130

SYSTEMS AND METHODS FOR ENHANCING UPLINK TRANSMISSION

CROSS-REFERENCE TO RELATED APPLICATION

This application claims the benefit of priority under 35 U.S.C. § 120 as a continuation of PCT Patent Application No. PCT/CN2020/119638, filed on Sep. 30, 2020, the disclosure of which is incorporated herein by reference in its entirety.

TECHNICAL FIELD

The present implementations relate generally to the field of telecommunications, and more particularly enhancing uplink transmission.

BACKGROUND

Wireless communication service covers more and more application scenarios, with the increasing degree of social digitization. Among them, enhanced mobile broadband, ultra-reliable and low latency communication and massive machine type of communication have become three major scenarios supported by fifth generation (5G) systems. However, conventional systems may not effectively meet coverage requirements for uplink transmission to transmit low-latency and high-reliability services within a short transmission time. Thus, a technological solution for enhancing uplink transmission is desired.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

Example implementations include a wireless communication method of dividing, by a wireless communication device, an uplink transmission into a plurality of virtual uplink transmissions based on one or more time-domain parameters, and determining, by the wireless communication device for each of the plurality of virtual uplink transmissions, respective time-domain positions of one or more demodulation reference signals.

Example implementations also include a wireless communication method of determining, by a wireless communication device, a number of valid symbols for an uplink transmission, and determining, by the wireless communication device for the uplink transmission, respective time-domain positions of one or more demodulation reference signals.

Example implementations also include a wireless communication method of identifying, by a wireless communication device, one or more valid symbols for an uplink transmission, dividing, by the wireless communication device, the uplink transmission into a first uplink transmission and a second uplink transmission, where the first and second uplink transmission are separated by the one or more valid symbols, and determining, by the wireless communication device for each of the first and second uplink transmissions, respective time-domain positions of one or more demodulation reference signals.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 9 illustrates a first example method in accordance with some implementations of the present disclosure.

DETAILED DESCRIPTION

Figure 1:
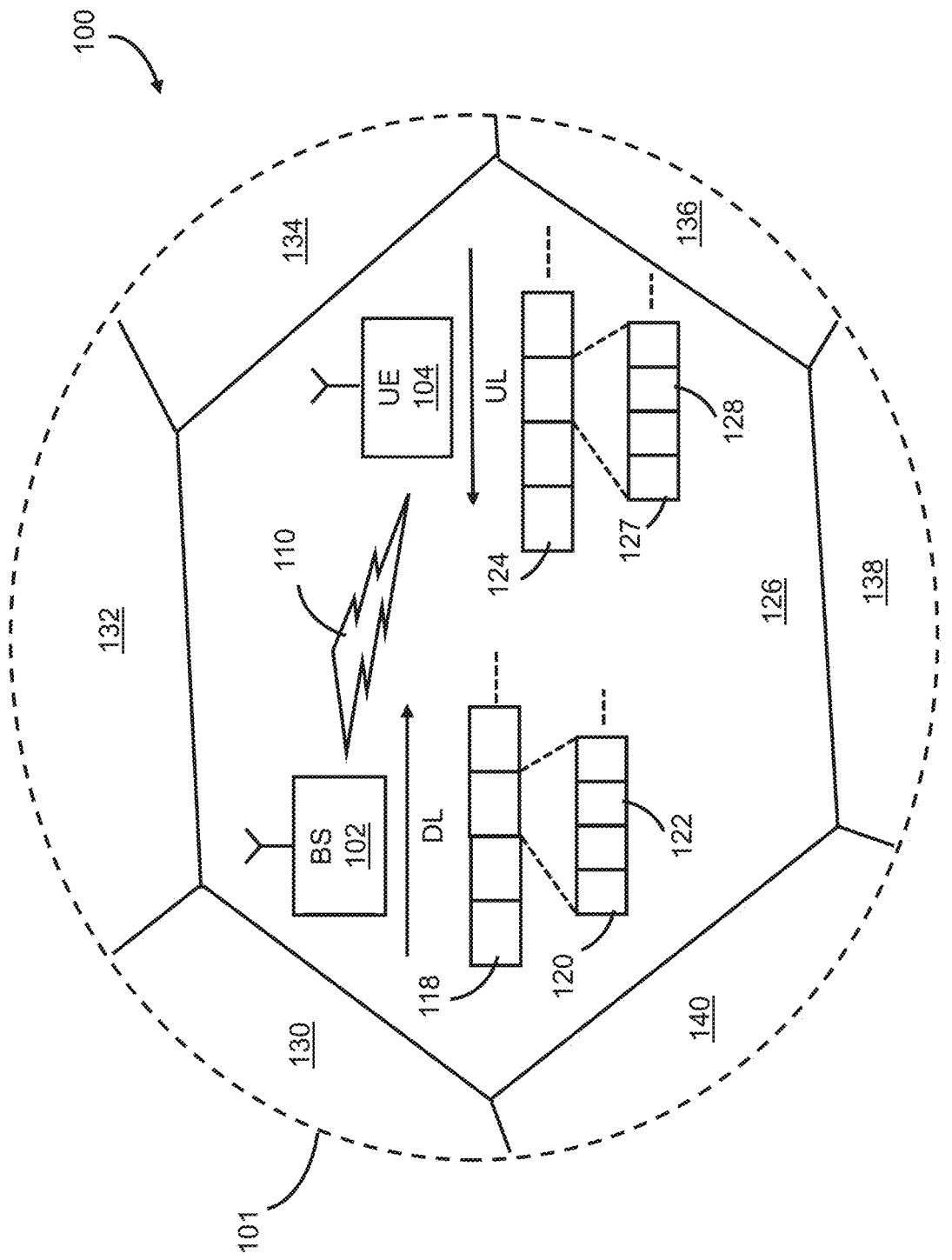
FIG. 1 illustrates an example cellular communication network in which techniques and other aspects disclosed herein may be implemented, in accordance with an embodiment of the present disclosure.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In various wireless implementations it is advantageous to ensure coverage and transmit low-latency and high-reliability services within a short transmission time. Thus, in some implementations, it is advantageous to transmit by one or more methods of uplink (UL) transmission. As one example, transmission can include dynamic scheduling-based aggregate transmission (Transport Block Aggregation for Uplink Transmission). As another example, transmission can include scheduling-free repeated transmission (Transport Block Repetition for Uplink Transmission with a Configured Grant). Further, in some implementations, it is advantageous to enhance repeated transmission of at least one Physical Uplink Shared Channel (PUSCH) or Transport Block (TB). Thus, in some implementations, the same PUSCH or TB is repeatedly transmitted once or more than once in the same time slot. In some implementations, at least one of the same PUSCH and the same TB is repeatedly sent across a slot boundary in multiple consecutive slots. In some implementations, a Msg3 PUSCH scheduled by a RAR UL grant in Type-1 random access procedure under various protocols is only transmitted once. Further, in some implementations, under a Type-2 random access procedure, the PUSCH of Msg A is only transmitted once.

In some implementations, under various protocols, it is advantageous to repeat transmission of at least one of the PUSCH and the TB to meet at least one coverage requirement. As one example, repeat transmission can include allowing the PUSCH to transmit across the slot boundary, invalid symbols, and PUSCH time-domain duration. In some implementations, a PUSCH time-domain duration is more than 14 symbols. However, it is to be understood that a PUSCH time-domain duration can be equal to or less than 14 symbols in some implementations. Thus, under various protocols, it is advantageous to determine a location of a Demodulation Reference Signal (DMRS) within a time domain. In some implementations, under various protocols, it is advantageous to meet one or more coverage requirements with one or more of a Msg3 PUSCH and a Msg A PUSCH. In some implementations, coverage requirements for one or more of a Msg3 PUSCH and a Msg A PUSCH include introducing multiple repetitions. Further, it is advantageous to meet the coverage requirement or requirements with one or more alternative, complementary, or like repetition transmission types.

In some implementations, under various protocols, it is advantageous to ensure coverage and transmit low-latency and high-reliability services within a short transmission time. In some implementations, aggregation for uplink transmission by a Downlink Control Information (DCI) is based at least partially on one or more of dynamic scheduling, and repetition without scheduling. In some implementations, a specific repeated transmission pattern is obtained based on one or more example processes. As one example, a time-domain resource assignment (TDRA) can be used to notify, set, determine, or the like, at least one of a start symbol and a time-domain duration of a first nominal repetition and a number of repetitive transmissions. In this example, the remaining nominal repetitions can be back-to-back continuous transmissions. As another example, a nominal repetition that crosses a slot boundary can be divided into multiple actual transmissions. As another example, a nominal repetition that encounters a symbol that cannot be transmitted can be divided into multiple actual transmissions.

In some implementations, under various protocols, if a transmission of PUSCH is allowed to cross a slot boundary or invalid symbols, and/or a time-domain duration of the PUSCH transmission is greater than 14 symbols, the existing protocols are unable to determine the DMRS location of the demodulated PUSCH. This is because, in some implementations, under various protocols, the DMRS specified by the various protocols introduces various restrictions on transmission. As one example, a restriction on transmission can include limiting duration of the PUSCH time domain to less than or equal to 14 symbols. As another example, a restriction on transmission can include preventing the PUSCH from crossing slot boundaries. It is to be understood that the terms "untransmissible" and "invalid" are used interchangeably throughout.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
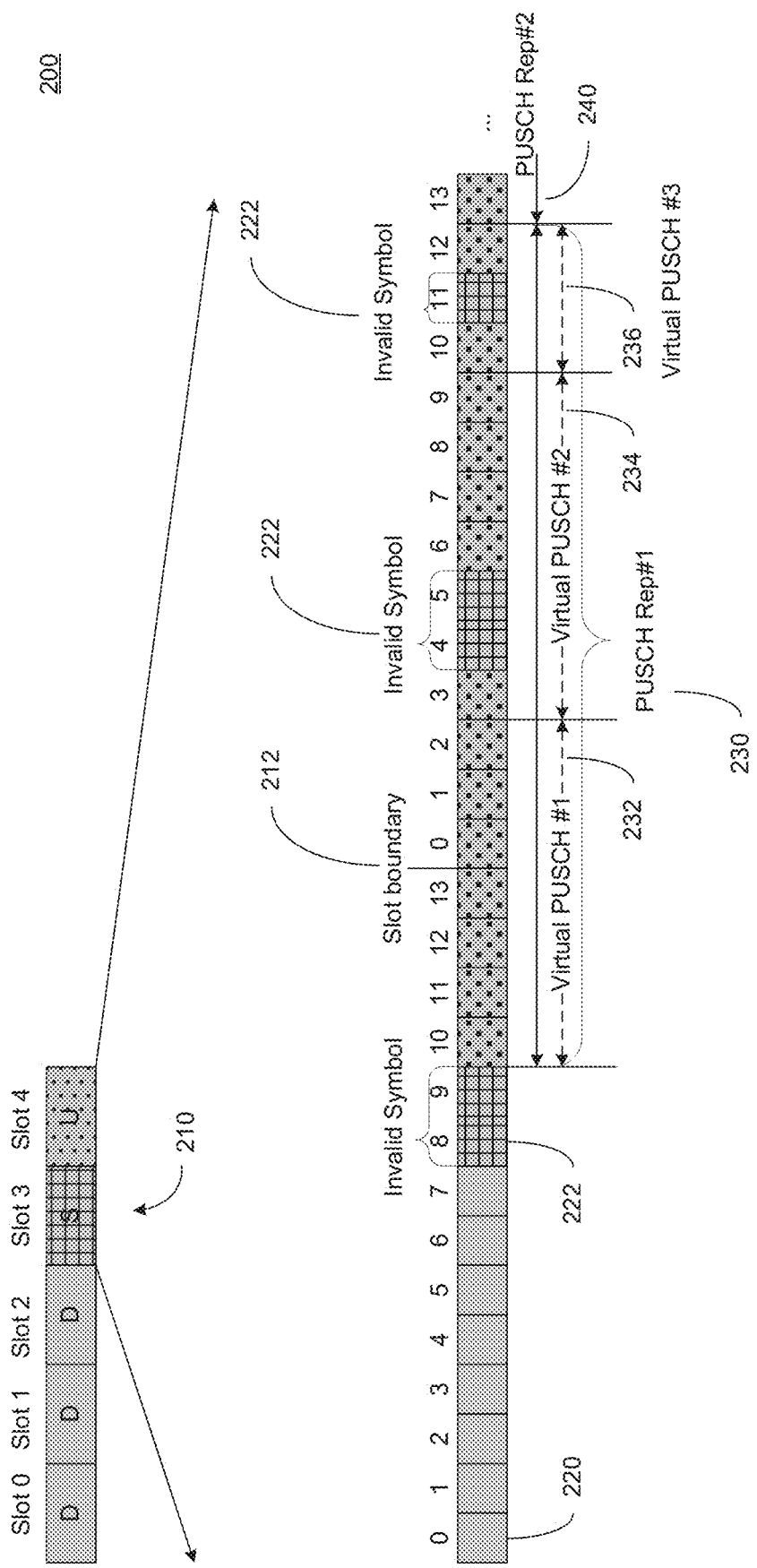
FIG. 2 is a schematic diagram illustrating an example generation of at least one virtual PUSCH including at least one invalid symbol and according to a threshold, in accordance with some implementations of the present disclosure.

FIG. 2 is a schematic diagram illustrating an example generation of at least one virtual PUSCH including at least one invalid symbol and according to a threshold, in accordance with some implementations of the present disclosure. Example implementation 200 describes a first example schematic to determine DMRS location according to a time-domain duration of a PUSCH. In some implementations, the example implementation 200 includes at least a portion of slot sequence 210, one or more time-domain symbols 220, one or more invalid time-domain symbols 222, a first PUSCH 230, and a second PUSCH 240. In some implementations, the slot sequence 210 includes a slot boundary 212. In some implementations, the first PUSCH 230 includes a first virtual PUSCH 232, a second virtual PUSCH 234, and a third virtual PUSCH 236.

In some implementations, an example system determines a DMRS location according to a time-domain threshold X. In some implementations, a time-domain duration of the first PUSCH 230 is divided into a number of virtual PUSCHs according to the threshold X. In some implementations, the first PUSCH 230 is divided into the three virtual PUSCHs 232, 234 and 236. It is to be understood that the PUSCH 230 can be divided into any number of virtual PUSCHs. In some implementations, each virtual PUSCH 232, 234 and 236 is determined according to a PUSCH DMRS position rule specified by a predetermined value. In some implementations, the position rule is defined by one or more various telecommunication protocols or the like. In some implementations, the threshold X is a natural number greater than or equal to 1. As one example, the threshold X can be equal to 7, as illustrated by way of example in FIG. 2. In this example, the first PUSCH 230 is divided into three virtual PUSCHs 232, 234, and 234. The first virtual PUSCH 232 includes 7 symbols, the second virtual PUSCH includes 7 symbols, and the third virtual PUSCH includes all of the remaining 3 symbols of the first PUSCH 230.

In some implementations, the example system determines one or more DMRS locations for each virtual PUSCH 232, 234 and 236, based on correspondences of Table 1. Table 1 illustrates an example correspondence between PUSCH symbols and DMRS positions, within a slot for single-symbol DMRS and intra-slot frequency hopping disabled, where parameter "$l_d$" and "$l_0$" refer to the time-domain duration of a (virtual) PUSCH transmission and the time-domain position of the first symbol of a (virtual) PUSCH transmission, respectively.

TABLE 1

| | DM-RS positions $\bar{l}$ | | | | | | | |
|---|---|---|---|---|---|---|---|---|
| $l_d$ in | PUSCH mapping type A DMRS - Additional Position | | | | PUSCH mapping type B DMRS - Additional Position | | | |
| symbols | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

Figure 3:
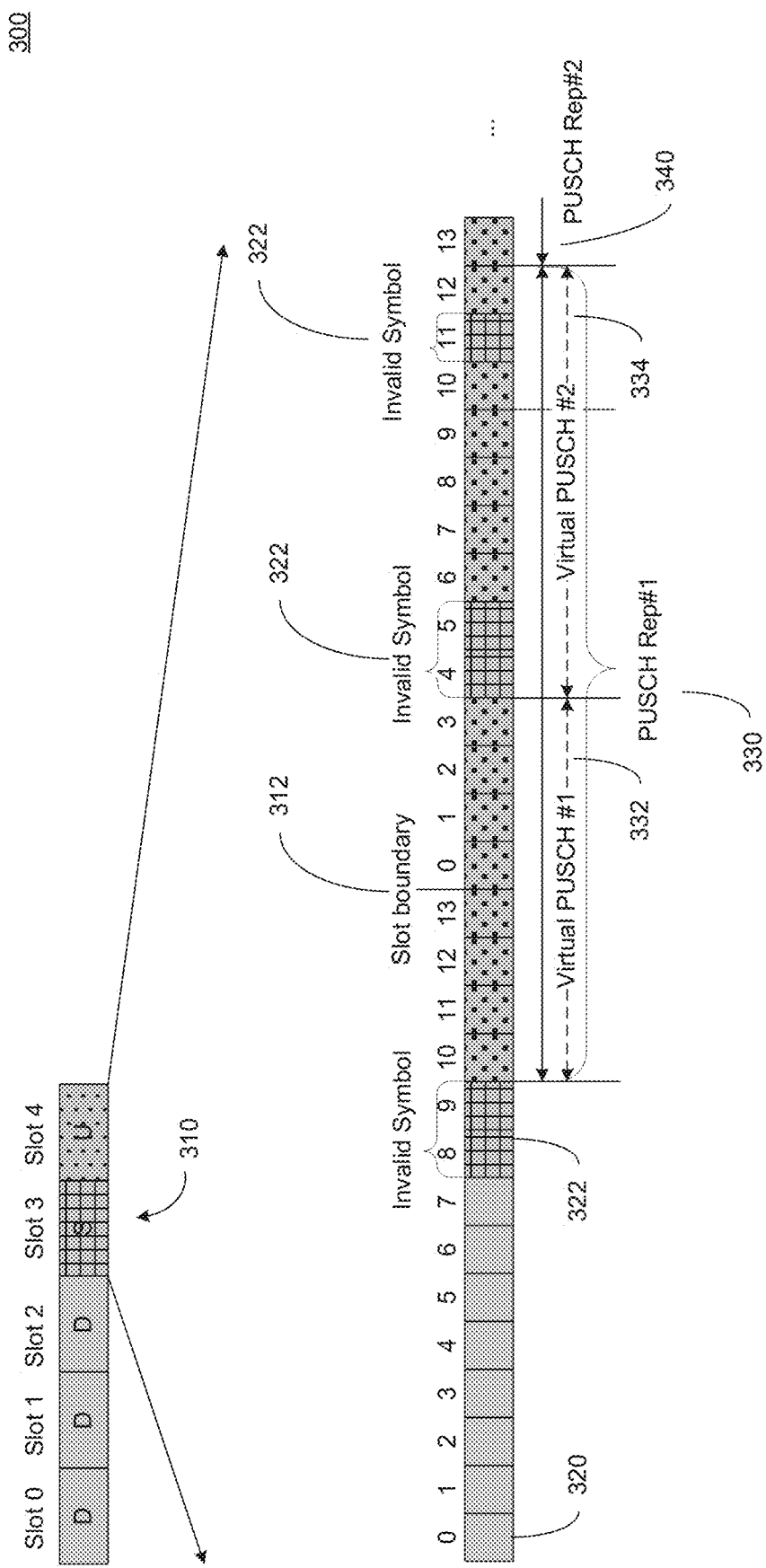
FIG. 3 is a schematic diagram illustrating an example generation of at least one virtual PUSCH including at least one invalid symbol and according to a virtual PUSCH number, in accordance with some implementations of the present disclosure.

FIG. 3 is a schematic diagram illustrating an example generation of at least one virtual PUSCH including at least one invalid symbol and according to a virtual PUSCH number, in accordance with some implementations of the present disclosure. Example implementation 300 describes a second example schematic to determine DMRS location according to a time-domain duration of a PUSCH. In some implementations, the example implementation 300 includes at least a portion of slot sequence 310, one or more time-domain symbols 320, one or more invalid time-domain symbols 320, a first PUSCH 330, and a second PUSCH 340. In some implementations, the slot sequence 310 includes a slot boundary 312. In some implementations, the first PUSCH 330 includes a first virtual PUSCH 332, and a second virtual PUSCH 334.

In some implementations, the time domain of the first PUSCH 330 is equally divided into several virtual PUSCHs, and each PUSCH is determined according to the PUSCH DMRS position rule specified by one or more various telecommunication protocols or the like. In some implementations, the average base is N. In some implementations, N is a natural number greater than or equal to 1. As example, if N is 2, then the first PUSCH 330 is divided into two virtual PUSCHs, the first virtual PUSCH 332 and the second virtual PUSCH 334. In this example, the time-domain length of the first virtual PUSCH is 8 symbols, by floor(17/2)=8. In this example, the time-domain length of the second virtual PUSCH 334 is 9 symbols, by 17—floor(17/2)=9. As another example, the time-domain length of the first virtual PUSCH is 9 symbols, by ceil(17/2)=9. In this example, the time-domain length of the second virtual PUSCH is 8 symbols, by 17—ceil(17/2)=8.

Figure 4:
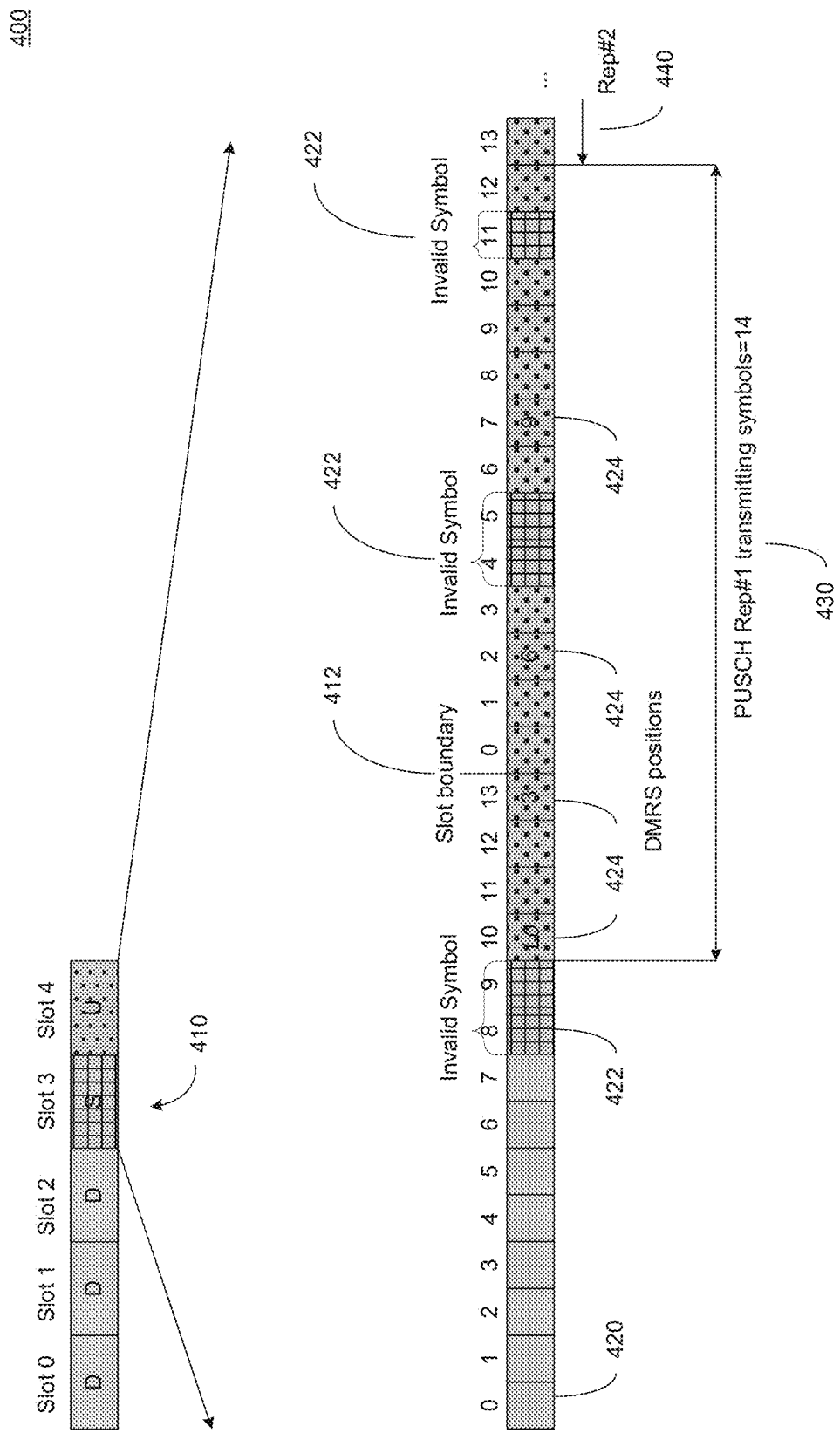
FIG. 4 is a schematic diagram illustrating an example generation of at least one DMRS symbol according to a number of transmissible symbols, in accordance with some implementations of the present disclosure.

FIG. 4 is a schematic diagram illustrating an example generation of at least one DMRS symbol according to a number of transmissible symbols, in accordance with some implementations of the present disclosure. Example implementation 400 describes a third example schematic to determine DMRS location according to a time-domain duration of a PUSCH. In some implementations, the example implementation 400 includes at least a portion of slot sequence 410, one or more time-domain symbols 420, one or more invalid time-domain symbols 422, a first PUSCH 430, and a second PUSCH 440. In some implementations, the slot sequence 410 includes a slot boundary 412. In some implementations, the first PUSCH 430 includes one or more DMRS positions 424.

In some implementations, the time-domain duration is the number of symbols actually transmitted for PUSCH. Thus, in some implementations, the time-domain duration does not include untransmissible, invalid, or like symbols 422. In some implementations, the transmittable symbols 420 in the first PUSCH 430 are based on the PUSCH DMRS position rule specified by one or more various telecommunication protocols or the like. As illustrated by way of example in FIG. 4, an example time-domain duration is 14 symbols, which does not include 3 untransmissible or invalid symbols 422. It is to be understood that the first PUSCH 430 can include more or fewer total symbols. It is to be further understood that the first PUSCH 430 can include more or fewer invalid symbols 422.

Figure 5:
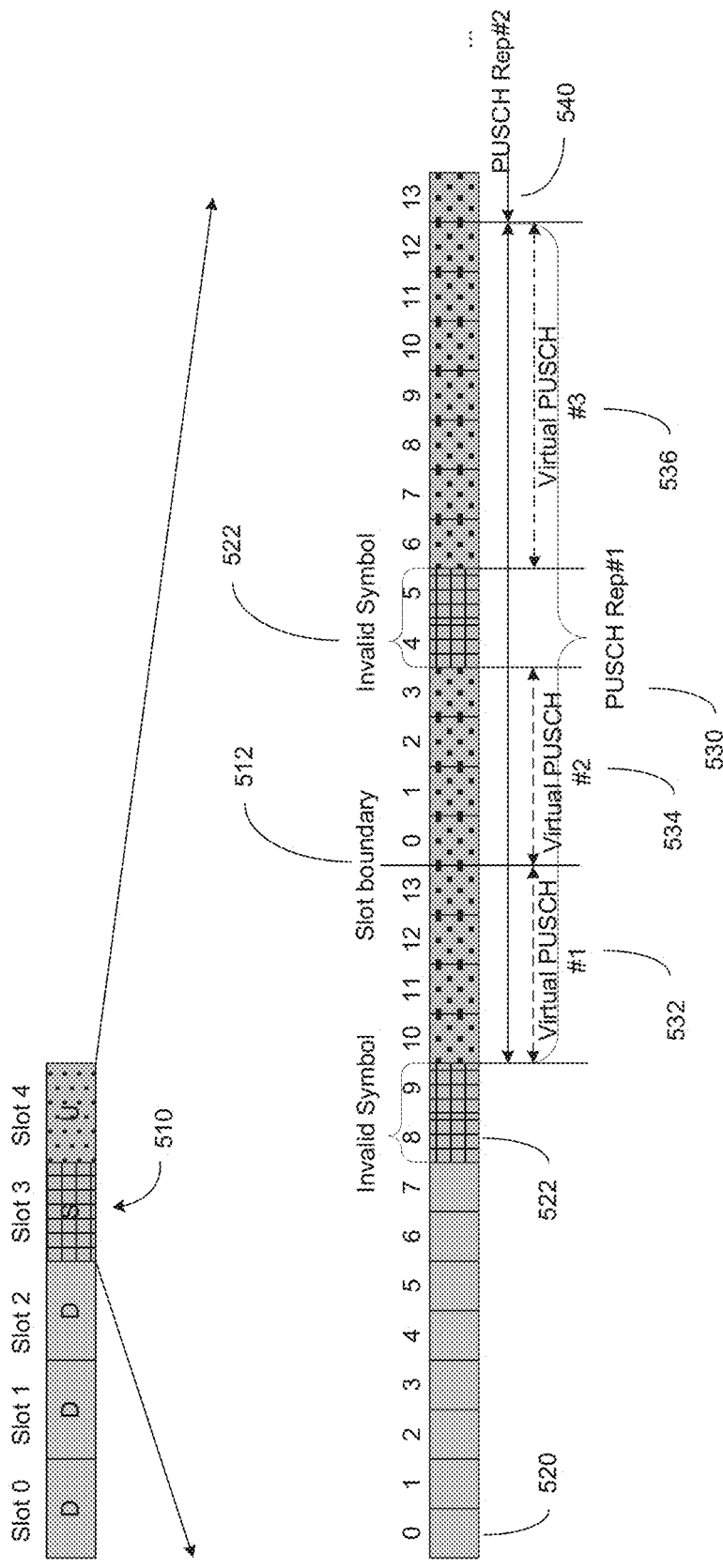
FIG. 5 is a schematic diagram illustrating an example generation of at least one virtual PUSCH excluding at least one invalid symbol, in accordance with some implementations of the present disclosure.

FIG. 5 is a schematic diagram illustrating an example generation of at least one virtual PUSCH excluding at least one invalid symbol, in accordance with some implementations of the present disclosure. Example implementation 500 describes a fourth example schematic to determine DMRS location according to at least one of a slot boundary and one or more invalid symbols. In some implementations, the example implementation 500 includes at least a portion of slot sequence 510, one or more time-domain symbols 520, one or more invalid time-domain symbols 522, a first PUSCH 530, and a second PUSCH 540. In some implementations, the slot sequence 510 includes a slot boundary 512. In some implementations, the first PUSCH 530 includes a first virtual PUSCH 532, a second virtual PUSCH 534, and a third virtual PUSCH 536. In some implementations, the first PUSCH 530 is divided into several virtual PUSCHs according to at least one of a time slot boundary and one or more invalid symbols. In some implementations, the example system determines each virtual PUSCH 532, 534, and 536 according to the PUSCH DMRS position rule specified by the various protocols. It is to be understood that the first PUSCH 530 can be divided into more or fewer virtual PUSCHs.

Figure 6:
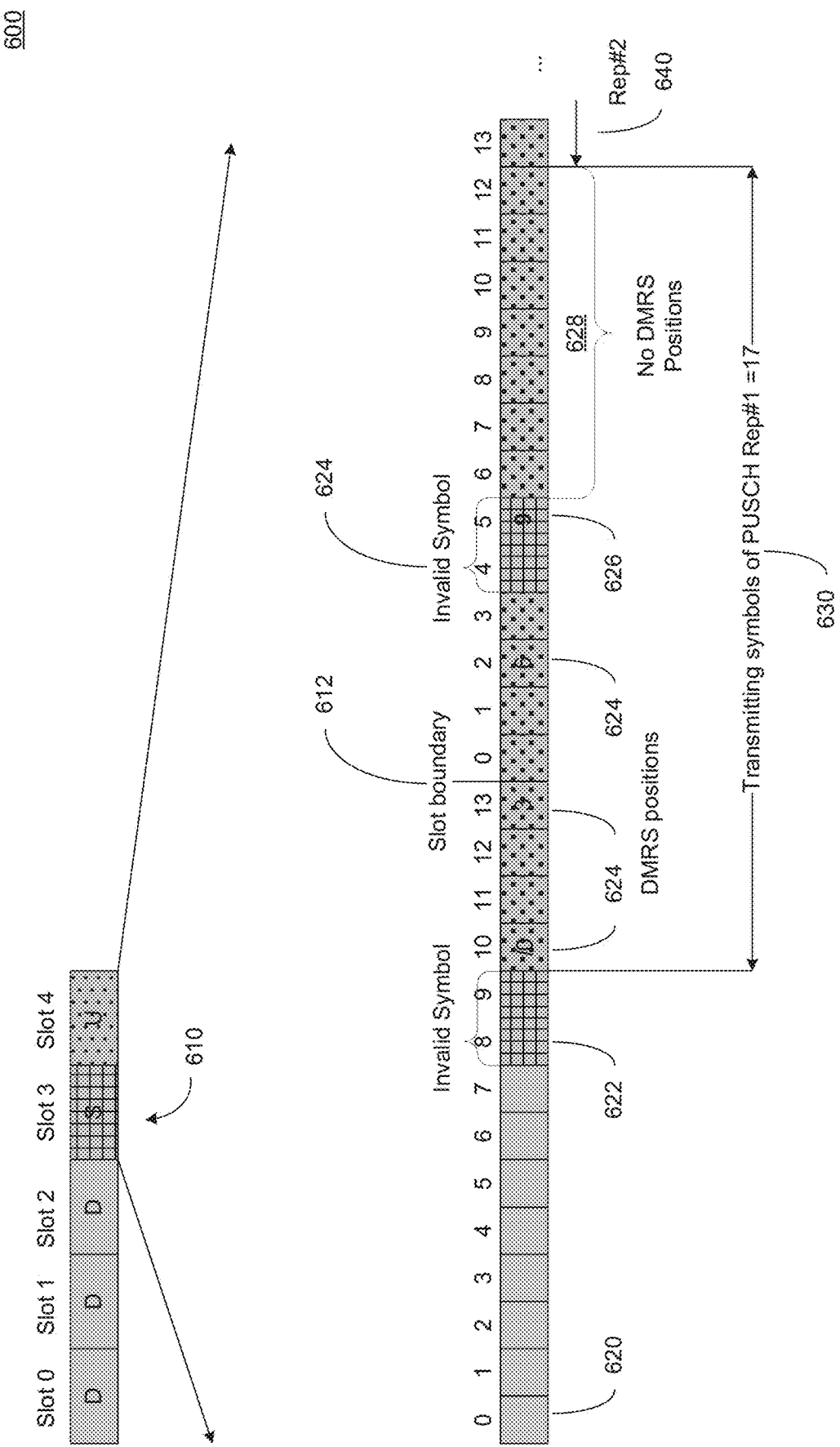
FIG. 6 is a schematic diagram illustrating an example generation of at least one DMRS symbol according to a number of invalid symbols, in accordance with some implementations of the present disclosure.

FIG. 6 is a schematic diagram illustrating an example generation of at least one DMRS symbol according to a number of invalid symbols, in accordance with some implementations of the present disclosure. Example implementation 600 describes a fifth example schematic to determine DMRS location according to at least one DMRS position. In some implementations, the example implementation 600 includes at least a portion of slot sequence 610, one or more time-domain symbols 620, one or more invalid time-domain symbols 622, a first PUSCH 630, and a second PUSCH 640. In some implementations, the slot sequence 610 includes a slot boundary 612. In some implementations, the first PUSCH 630 includes one or more DMRS positions 624. In some implementations, the first PUSCH 630 includes one or more DMRS positions 626 corresponding to an invalid symbol 624.

In some implementations, a time-domain duration of the first PUSCH 630 that includes one or more untransmissible or invalid symbols 622, and the symbol index determined by at least one of the DMRS locations 624 also includes one or more untransmissible symbols 626. Thus, in some implementations, the example system enters a state in which the DMRS location is on an untransmissible symbol, and there is no DMRS in the first PUSCH 630 immediately after the invalid symbol 626 in the time domain. In some implementations, the rear part of the first PUSCH 630 shares the DMRS of the front part of the first PUSCH 630. Alternatively, in some implementations, the example system places the DMRS 624 on the first symbol of the rear part of the first PUSCH 630. In some implementations, placement of the DMRS is based at least partially on a threshold Y and a number of invalid symbols. As one example, in response to a number of invalid symbols 624 or 626 less than or equal to the threshold Y, the rear part of the first PUSCH 630 shares the DMRS of the front part of the first PUSCH 630. As another example, in response to a number of invalid symbols greater than the threshold Y, the example system places the DMRS 624 on the first symbol of the first PUSCH 630.

Figure 7:
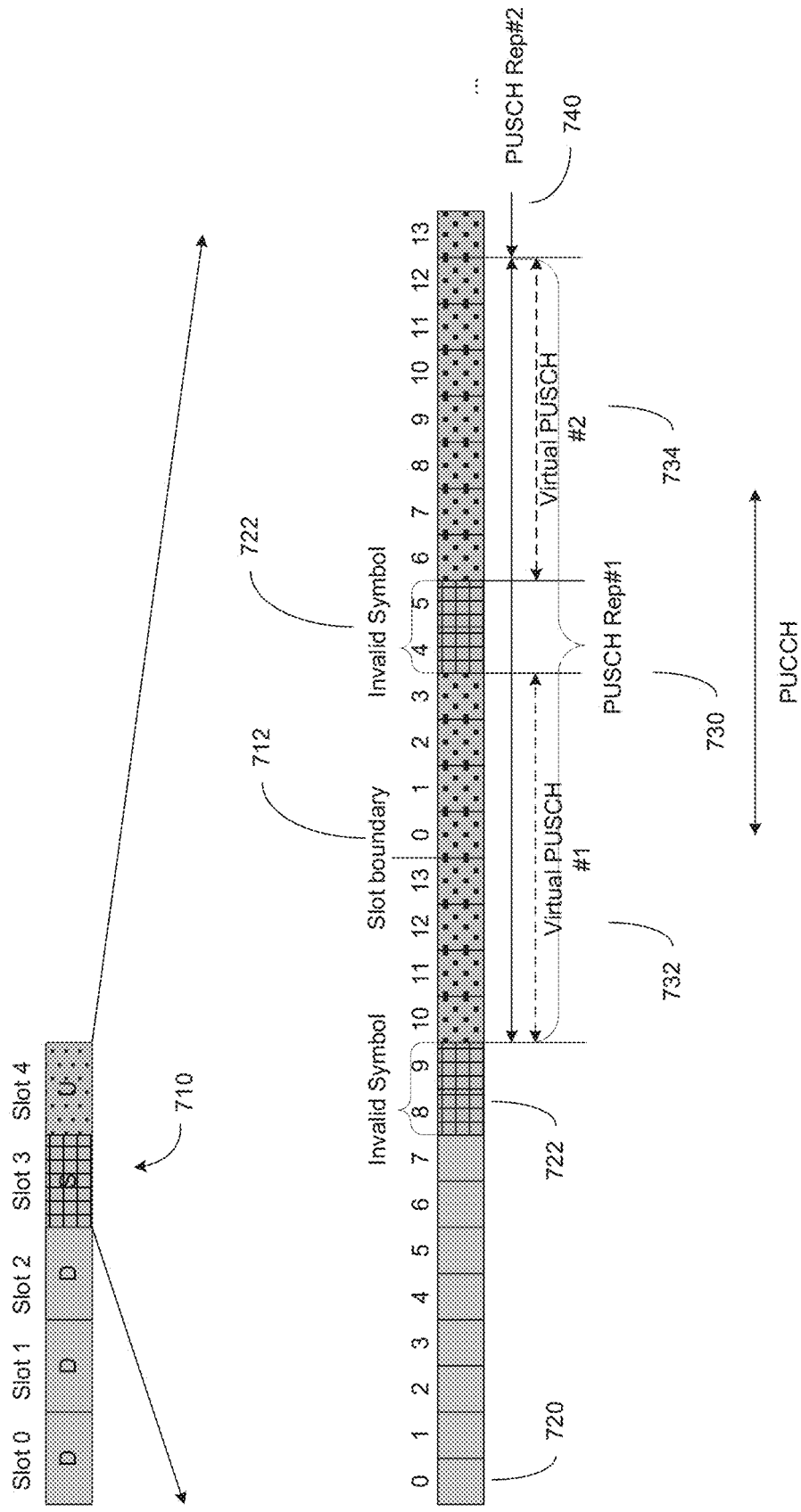
FIG. 7 is a schematic diagram illustrating an example generation of at least one virtual PUSCH excluding at least one invalid symbol and across at least one slot boundary, in accordance with some implementations of the present disclosure.

FIG. 7 is a schematic diagram illustrating an example generation of at least one virtual PUSCH excluding at least one invalid symbol and across at least one slot boundary, in accordance with some implementations of the present disclosure. Example implementation 700 describes some implementations to determine DMRS location according to at least one of a slot boundary and one or more invalid symbols. In some implementations, the example implementation 700 includes at least a portion of slot sequence 710, one or more time-domain symbols 720, one or more invalid time-domain symbols 722, a first PUSCH 730, and a second PUSCH 740. In some implementations, the slot sequence 710 includes a slot boundary 712. In some implementations, the first PUSCH 730 includes a first virtual PUSCH 732, and a second virtual PUSCH 734. In some implementations, the first PUSCH 730 is divided into several virtual PUSCHs according to at least one of a time slot boundary and one or more invalid symbols. In some implementations, the example system determines each virtual PUSCH 732 and 734 according to the PUSCH DMRS position rule specified by various protocols. It is to be understood that the first PUSCH 730 can be divided into more or fewer virtual PUSCHs.

In some implementations, under various protocols, multiple symbols in a time slot may include uplink symbols (DL, downlink symbols), downlink symbols (UL, uplink symbols) and flexible symbols (F, Flexible symbols) configured in a semi-static frame structure. In some implementations, for uplink information to be transmitted by a terminal, only uplink symbols configured with a semi-static frame structure and some flexible symbols can be used. In some implementations, when the transmitted uplink information encounters the dynamic SFI (Dynamic Slot format indicator) indicating the D symbol or the F symbol, a collision will occur. In some implementations, under various protocols, when a certain PUSCH in an Uplink Transmission with a Configured Grant encounters a Dynamic SFI indication D or F, the PUSCH will be discarded.

In some implementations, under various protocols, a certain transmission of PUSCH is allowed to cross the slot boundary or cannot transmit symbols, and the time-domain duration is greater than 14 symbols, as shown by way of example in FIG. 7. In some implementations, when symbols #10 and #11 of Slot #3 corresponding to PUSCH Rep #1 are indicated as D or F by Dynamic SFI, are directly discarded under various protocols, coverage performance of the PUSCH can be impacted.

Thus, in some implementations, a terminal obtains configuration information to complete scheduling-free PUSCH transmission. In some implementations, the terminal obtains configuration information through RRC signaling or DCI. When the configuration information is configured or the configuration information is enabled, rate matching is performed on PUSCH transmission. When the configuration information is configured or the configuration information is enabled, the terminal does not receive or detect the Dynamic SFI. In response, the terminal continues to send PUSCH Rep #1. Further, in some implementations, rate matching is performed on the PUSCH transmission. For example, PUSCH Rep #1 removes the first two symbols and uses the remaining symbols for transmission.

In some implementations, under various protocols, a certain transmission of PUSCH is allowed to cross the slot boundary where symbols cannot be transmitted, and the duration of the time domain is greater than 14 symbols. In some implementations, when PUSCH transmission and PUCCH transmission overlap in the time domain, the time-domain overlap area includes PUSCH transmittable symbols and non-transmissible symbols. After PUSCH Rep #1 encounters an untransmissible symbol, it is virtualized into two PUSCHs, then the UCI carried on the PUCCH is multiplexed on the earliest virtual PUSCH #1 that meets the timeline. The timeline refers to the provisions of section 9.2.5 of the standard 38.213. For example, in some implementations, the start symbol of the PUSCH or PUCCH to be transmitted first must meet the following timeline condition: the start symbol is no earlier than the time after the end of any PDSCH $T_{proc,1}^{max}=(N_1+d_{1,1}+1)\cdot(2048+144)\cdot\kappa\cdot 2^{-\mu}\cdot T_C$ time. In some implementations, any PDSCH refers to one or more PDSCH(s) corresponding to the HARQ-ACK codebook included in the UCI.

Further, in some implementations, PUSCH transmission and PUCCH transmission overlap in the time domain. In response, when the UCI carried on the PUCCH is multiplexed on the earliest virtual PUSCH #1 that meets the timeline, it is determined that the number of all coded modulation symbols for each layer of UCI is determined based on the PUSCH. Further, in some implementations, it is limited that the number of coded modulation symbols used for each layer of information of the UCI does not exceed the total number of resources multiplexed on the virtual PUSCH. In some implementations, the number of all modulation symbols in each layer of information refers to HARQ-ACK (Hybrid ARQ), CSI part 1 (Channel-Satate Information, channel state information), and CSI part 2. In some implementations, PUSCH Rep #1, including non-transmissible symbols, crosses slot boundaries. The number of all modulation symbols defining each layer of information of the UCI does not exceed the total number of resources multiplexed on the virtual PUSCH. In some implementations, the PUSCH is divided into two virtual PUSCHs according to non-transmissible symbols, which does not exceed the number of resources multiplexed in virtual PUSCH #1. Further, PUSCH transmission carries TB or UL-SCH.

In some implementations, the PUSCH is repeatedly transmitted multiple times, a certain transmission of the PUSCH is allowed to cross the slot boundary or cannot transmit symbols, and the time-domain duration is greater than 14 symbols. In some implementations, for these uplink repeated transmissions, the PUSCH transmission opportunity i and the corresponding transmission power can be determined by the following method. PUSCH transmission opportunity i refers to a virtual segmented PUSCH. Thus, in some implementations, the virtual segmented PUSCH can be determined by at least one of the following methods.

In some implementations, an example system determines division according to the time-domain threshold X. The time-domain duration of the PUSCH is divided into a number of virtual PUSCHs according to the threshold X. In some implementations, the example system divides the PUSCH into several virtual PUSCHs according to the time slot boundary or invalid symbols. Thus, in some implementations, the transmit power of each virtual PUSCH is the same. Further, in some implementations, the PUSCH is repeatedly transmitted multiple times, a certain transmission of the PUSCH is allowed to cross the slot boundary or cannot transmit symbols, and the time-domain duration is greater than 14 symbols. For these uplink repeated transmissions, the transport block size (transport block size, TBS) of the PUSCH can be determined, in some implementations, according to the PUSCH with the longest virtual segment time domain. The virtual segmented PUSCH can be determined by the method in the above embodiments. In some implementations, the TBS can also be determined according to the PUSCH with the shortest virtual segment time domain.

Figures 8A, 8B:
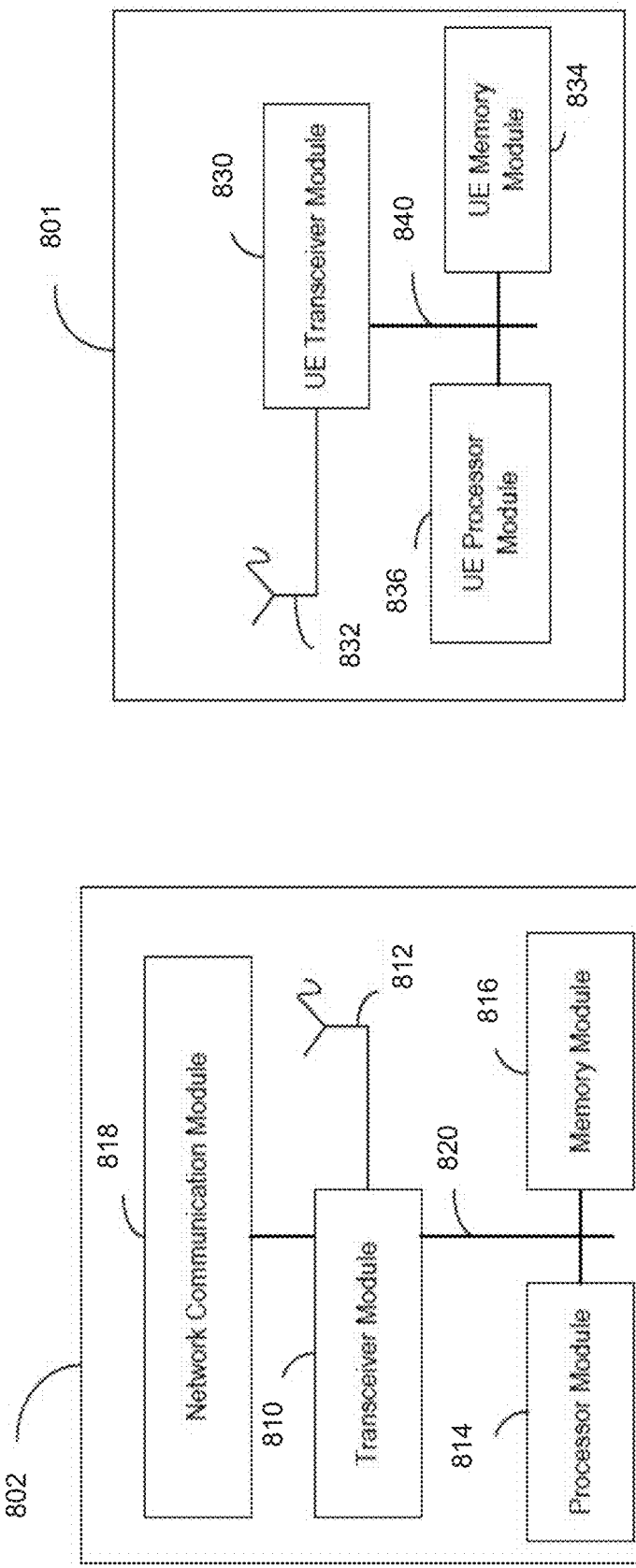
FIG. 8A illustrates a block diagram of an example base station, in accordance with some implementations of the present disclosure.
FIG. 8B illustrates a block diagram of an example UE, in accordance with some implementations of the present disclosure.

FIG. 8A illustrates a block diagram of an example base station 802, in accordance with some implementations of the present disclosure. FIG. 8B illustrates a block diagram of an example UE 801, in accordance with some implementations of the present disclosure. Referring to FIGS. 1-7B, the UE 801 (e.g., a wireless communication device, a terminal, a mobile device, a mobile user, and so on) is an example implementation of the UEs described herein, and the base station 802 is an example implementation of the base station described herein.

The base station 802 and the UE 801 can include components and elements configured to support known or conventional operating features that need not be described in detail herein. In one illustrative implementation, the base station 802 and the UE 801 can be used to communicate (e.g., transmit and receive) data symbols in a wireless communication environment, as described above. For instance, the base station 802 can be a base station (e.g., gNB, eNB, and so on), a server, a node, or any suitable computing device used to implement various network functions.

The base station 802 includes a transceiver module 810, an antenna 812, a processor module 814, a memory module 816, and a network communication module 818. The modules 810, 812, 814, 816, and 818 are operatively coupled to and interconnected with one another via a data communication bus 820. The UE 801 includes a UE transceiver module 830, a UE antenna 832, a UE memory module 834, and a UE processor module 836. The modules 830, 832, 834, and 836 are operatively coupled to and interconnected with one another via a data communication bus 840. The base station 802 communicates with the UE 801 or another base station via a communication channel, which can be any wireless channel or other medium suitable for transmission of data as described herein.

As would be understood by persons of ordinary skill in the art, the base station 802 and the UE 801 can further include any number of modules other than the modules shown in FIGS. 8A and 8B. The various illustrative blocks, modules, circuits, and processing logic described in connection with the implementations disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The implementations described herein can be implemented in a suitable manner for each particular application, but any implementation decisions should not be interpreted as limiting the scope of the present disclosure.

In accordance with some implementations, the UE transceiver 830 includes a radio frequency (RF) transmitter and a RF receiver each including circuitry that is coupled to the antenna 832. A duplex switch (not shown) may alternatively couple the RF transmitter or receiver to the antenna in time duplex fashion. Similarly, in accordance with some implementations, the transceiver 810 includes an RF transmitter and a RF receiver each having circuitry that is coupled to the antenna 812 or the antenna of another base station. A duplex switch may alternatively couple the RF transmitter or receiver to the antenna 812 in time duplex fashion. The operations of the two transceiver modules 810 and 830 can be coordinated in time such that the receiver circuitry is coupled to the antenna 832 for reception of transmissions over a wireless transmission link at the same time that the transmitter is coupled to the antenna 812. In some implementations, there is close time synchronization with a minimal guard time between changes in duplex direction.

The UE transceiver 830 and the transceiver 810 are configured to communicate via the wireless data communication link, and cooperate with a suitably configured RF antenna arrangement 812/832 that can support a particular wireless communication protocol and modulation scheme. In some illustrative implementations, the UE transceiver 830 and the transceiver 810 are configured to support industry standards such as the Long Term Evolution (LTE) and emerging 5G standards, and the like. It is understood, however, that the present disclosure is not necessarily limited in application to a particular standard and associated protocols. Rather, the UE transceiver 830 and the base station transceiver 810 may be configured to support alternate, or additional, wireless data communication protocols, including future standards or variations thereof.

The transceiver 810 and the transceiver of another base station (such as but not limited to, the transceiver 810) are configured to communicate via a wireless data communication link, and cooperate with a suitably configured RF antenna arrangement that can support a particular wireless communication protocol and modulation scheme. In some illustrative implementations, the transceiver 810 and the transceiver of another base station are configured to support industry standards such as the LTE and emerging 5G standards, and the like. It is understood, however, that the present disclosure is not necessarily limited in application to a particular standard and associated protocols. Rather, the transceiver 810 and the transceiver of another base station may be configured to support alternate, or additional, wireless data communication protocols, including future standards or variations thereof.

In accordance with various implementations, the base station 802 may be a base station such as but not limited to, an eNB, a serving eNB, a target eNB, a femto station, or a pico station, for example. The base station 802 can be an RN, a regular, a DeNB, or a gNB. In some implementations, the UE 801 may be embodied in various types of user devices such as a mobile phone, a smart phone, a personal digital assistant (PDA), tablet, laptop computer, wearable computing device, etc. The processor modules 814 and 836 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 814 and 836, respectively, or in any practical combination thereof. The memory modules 816 and 834 may be realized as RAM memory, flash memory, ROM memory, EPROM memory, EEPROM memory, registers, a hard disk, a removable disk, a CD-ROM, or any other form of storage medium known in the art. In this regard, memory modules 816 and 834 may be coupled to the processor modules 810 and 830, respectively, such that the processors modules 810 and 830 can read information from, and write information to, memory modules 816 and 834, respectively. The memory modules 816 and 834 may also be integrated into their respective processor modules 810 and 830. In some implementations, the memory modules 816 and 834 may each include a cache memory for storing temporary variables or other intermediate information during execution of instructions to be executed by processor modules 810 and 830, respectively. Memory modules 816 and 834 may also each include non-volatile memory for storing instructions to be executed by the processor modules 810 and 830, respectively.

The network communication module 818 generally represents the hardware, software, firmware, processing logic, and/or other components of the base station 802 that enable bi-directional communication between the transceiver 810 and other network components and communication nodes in communication with the base station 802. For example, the network communication module 818 may be configured to support internet or WiMAX traffic. In a deployment, without limitation, the network communication module 818 provides an 802.3 Ethernet interface such that the transceiver 810 can communicate with a conventional Ethernet based computer network. In this manner, the network communication module 818 may include a physical interface for connection to the computer network (e.g., Mobile Switching Center (MSC)). In some implementations, the network communication module 818 includes a fiber transport connection configured to connect the base station 802 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

FIG. 9 illustrates an example method in accordance with some implementations of the present disclosure. In some implementations, at least one of the base station 802 and the UE 801 performs method 900 according to present implementations. In some implementations, the method 900 begins at step 910. At step 910, an example system divides an uplink transmission into a plurality of virtual uplink transmissions based on one or more time-domain parameters. In some implementations, step 910 includes step 912. The method 910 then continues to step 920. At step 920, the example system determines respective time-domain positions of one or more demodulation reference signals. In some implementations, the method 900 ends at step 920.

Figure 10:
FIG. 10 illustrates a second example method in accordance with some implementations of the present disclosure.

FIG. 10 illustrates an example method in accordance with some implementations of the present disclosure. In some implementations, at least one of the base station 802 and the UE 801 performs method 1000 according to present implementations. In some implementations, the method 1000 begins at step 1010. At step 1010, an example system determines a number of valid symbols for an uplink transmission. The method 1000 then continues to step 1020. At step 1020, the example system determines respective time-domain positions of one or more demodulation reference signals. In some implementations, the method 1000 ends at step 1020.

Figure 11:
FIG. 11 illustrates a third example method in accordance with some implementations of the present disclosure.
Figure 11:

FIG. 11 illustrates an example method in accordance with some implementations of the present disclosure. In some implementations, at least one of the base station 802 and the UE 801 performs method 1100 according to present implementations. In some implementations, the method 1100 begins at step 1110. At step 1110, an example system identifies one or more invalid symbols for an uplink transmission. The method 1100 then continues to step 1120. At step 1120, the example system divides the uplink transmission into a first uplink transmission and a second uplink transmission, where the first and second uplink transmission are separated by the one or more invalid symbols. In some implementations, step 1120 includes step 1122. The method 1100 continues to step 1130. At step 1130, the example system determines respective time-domain positions of one or more demodulation reference signals. In some implementations, the method 1100 ends at step 1130.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A wireless communication method, comprising:
  dividing, by a wireless communication device, an uplink transmission into a plurality of virtual uplink transmissions based on one or more time-domain parameters, wherein the one or more time-domain parameters include a duration of the uplink transmission and at least one of: a slot boundary or an invalid symbol; and determining, by the wireless communication device for each of the plurality of virtual uplink transmissions, respective time-domain positions of one or more demodulation reference signals.

2. The wireless communication method of claim 1, further comprising repetitively sending, by the wireless communication device to a wireless communication node, the uplink transmission.

3. The wireless communication method of claim 1, wherein the one or more time-domain parameters include a time-domain threshold.

4. The wireless communication method of claim 3, wherein one or more of the plurality of virtual uplink transmissions each has a duration equal to the time-domain threshold, the method further comprising:

determining, by the wireless communication device for each of the one or more virtual uplink transmissions, the respective time-domain positions of the one or more demodulation reference signals by using the duration of the one or more virtual uplink transmissions as a duration parameter indicated in a preconfigured table.

5. The wireless communication method of claim 4, wherein a remaining one of the plurality of virtual uplink transmissions has a duration less than the time-domain threshold, the method further comprising:

determining, by the wireless communication device for the remaining virtual uplink transmission, the respective time-domain positions of the one or more demodulation reference signals by using the duration of the remaining virtual uplink transmission as the duration parameter indicated in the preconfigured table.

6. The wireless communication method of claim 1, wherein the one or more time-domain parameters include a number of the virtual uplink transmissions.

7. The wireless communication method of claim 6, wherein one or more of the plurality of virtual uplink transmissions each has a duration equal to (floor((the duration of the uplink transmission)/(the number of the virtual uplink transmissions))), the method further comprising:

determining, by the wireless communication device for each of the one or more virtual uplink transmissions, the respective time-domain positions of the one or more demodulation reference signals by using the duration of the one or more virtual uplink transmissions as a duration parameter indicated in a preconfigured table.

8. The wireless communication method of claim 7, wherein a remaining one of the plurality of virtual uplink transmissions has a duration equal to (the duration of the uplink transmission−floor(the duration of the uplink transmission/the number of the virtual uplink transmissions)), the method further comprising:

determining, by the wireless communication device for the remaining virtual uplink transmission, the respective time-domain positions of the one or more demodulation reference signals by using the duration of the remaining virtual uplink transmission as the duration parameter indicated in the preconfigured table.

9. The wireless communication method of claim 6, wherein one or more of the plurality of virtual uplink transmissions each has a duration equal to (ceil((the duration of the uplink transmission/(the number of the virtual uplink transmissions))), the method further comprising:

determining, by the wireless communication device for each of the one or more virtual uplink transmissions, the respective time-domain positions of the one or more demodulation reference signals by using the duration of the one or more virtual uplink transmissions as a duration parameter indicated in a preconfigured table.

10. The wireless communication method of claim 9, wherein a remaining one of the plurality of virtual uplink transmissions has a duration equal to (the duration of the uplink transmission−ceil((the duration of the uplink transmission)/(the number of the virtual uplink transmissions))), the method further comprising:

determining, by the wireless communication device for the remaining virtual uplink transmission, the respective time-domain positions of the one or more demodulation reference signals by using the duration of the remaining virtual uplink transmission as the duration parameter indicated in the preconfigured table.

11. The wireless communication method of claim 1, wherein a first one and a second one of the plurality of virtual uplink transmissions are separated by the slot boundary or the invalid symbol, the first virtual uplink transmission having a first duration and the second virtual uplink transmission having a second duration, the method further comprising:

determining, by the wireless communication device for the first virtual uplink transmission, the respective time-domain positions of the one or more demodulation reference signals by using the first duration as a duration parameter indicated in a preconfigured table; and determining, by the wireless communication device for the second virtual uplink transmission, the respective time-domain positions of the one or more demodulation reference signals by using the second duration as the duration parameter indicated in the preconfigured table.

12. A wireless communication device, comprising:

at least one processor configured to:

divide an uplink transmission into a plurality of virtual uplink transmissions based on one or more time-domain parameters, wherein the one or more time-domain parameters include a duration of the uplink transmission and at least one of: a slot boundary or an invalid symbol; and determine, for each of the plurality of virtual uplink transmissions, respective time-domain positions of one or more demodulation reference signals.

13. The wireless communication device of claim 12, wherein the at least one processor is further configured to repetitively send, via a transmitter to a wireless communication node, the uplink transmission.

14. The wireless communication device of claim 12, wherein the one or more time-domain parameters include and a time-domain threshold.

15. The wireless communication device of claim 14, wherein one or more of the plurality of virtual uplink transmissions each has a duration equal to the time-domain threshold, and the at least one processor is further configured to:

determine, for each of the one or more virtual uplink transmissions, the respective time-domain positions of the one or more demodulation reference signals by using the duration of the one or more virtual uplink transmissions as a duration parameter indicated in a preconfigured table.

* * * * *